(12) United States Patent
Kol et al.

(10) Patent No.: US 8,752,152 B2
(45) Date of Patent: Jun. 10, 2014

(54) FEDERATED AUTHENTICATION FOR MAILBOX REPLICATION

(75) Inventors: Ayla Kol, Sammamish, WA (US);
Dmitri Gavrilov, Redmond, WA (US);
Bradford Clark, Duval, WA (US);
Brian T. Kress, Redmond, WA (US);
James C. Kleewein, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 500 days.

(21) Appl. No.: 12/637,043

(22) Filed: Dec. 14, 2009

(65) Prior Publication Data

US 2011/0145565 A1 Jun. 16, 2011

(51) Int. Cl.
*H04L 29/06* (2006.01)

(52) U.S. Cl.
USPC .................................................. 726/9; 726/8

(58) Field of Classification Search
None
See application file for complete search history.

(56) References Cited

U.S. PATENT DOCUMENTS

| | | | |
|---|---|---|---|
| 7,260,836 B2 | 8/2007 | Roskind et al. | |
| 7,356,694 B2* | 4/2008 | Mayo et al. | 713/159 |
| 7,519,596 B2 | 4/2009 | Iyer et al. | |
| 7,562,382 B2 | 7/2009 | Hinton et al. | |
| 7,603,555 B2* | 10/2009 | Schmidt et al. | 713/168 |
| 7,647,381 B2* | 1/2010 | Logue et al. | 709/206 |
| 8,255,984 B1* | 8/2012 | Ghostine et al. | 726/8 |
| 8,356,179 B2* | 1/2013 | Tie et al. | 713/170 |
| 2001/0045451 A1* | 11/2001 | Tan et al. | 235/375 |
| 2002/0138765 A1* | 9/2002 | Fishman et al. | 713/201 |
| 2004/0187031 A1* | 9/2004 | Liddle | 713/201 |
| 2005/0204148 A1* | 9/2005 | Mayo et al. | 713/185 |
| 2005/0223217 A1* | 10/2005 | Howard et al. | 713/155 |
| 2005/0223413 A1* | 10/2005 | Duggan et al. | 726/3 |
| 2006/0123465 A1 | 6/2006 | Ziegler | |
| 2006/0136990 A1* | 6/2006 | Hinton et al. | 726/2 |
| 2007/0244973 A1* | 10/2007 | Pearson | 709/206 |
| 2008/0010288 A1 | 1/2008 | Hinton et al. | |
| 2008/0021866 A1 | 1/2008 | Hinton et al. | |
| 2008/0046984 A1 | 2/2008 | Bohmer et al. | |
| 2009/0259753 A1* | 10/2009 | Hinton et al. | 709/226 |
| 2009/0319781 A1* | 12/2009 | Byrum et al. | 713/156 |
| 2010/0306535 A1* | 12/2010 | Jain et al. | 713/168 |
| 2011/0138478 A1* | 6/2011 | Kaarela et al. | 726/27 |
| 2011/0214172 A1* | 9/2011 | Hermann et al. | 726/7 |

OTHER PUBLICATIONS

Kang, et al., "A Peer-to-Peer Federated Authentication System", Retrieved at <<http://ieeexplore.ieee.org/stamp/stamp.jsp?arnumber=05070648>>, Proceedings of the 2009 Sixth International Conference on Information Technology: New Generations, Apr. 27-29, 2009, pp. 382-387.

"Federated Identity, Distributed PKI and Smart Cards", Retrieved at <<http://www.isode.com/whitepapers/smartcard-federated-directory.html>>, Isode Whitepapers, Oct. 29, 2009, pp. 6.

(Continued)

*Primary Examiner* — Michael R Vaughan
(74) *Attorney, Agent, or Firm* — Louise Bowman; Brian Haslam; Micky Minhas (57) ABSTRACT

A data replication mechanism is proposed that relies on existing federation infrastructure enabling distributed authentication instead of storing and using explicit credentials for a remote forest. The data replication mechanism requests a federation token with data replication capabilities targeted to the remote forest and passes this token to the remote forest in lieu of explicit credentials.

19 Claims, 6 Drawing Sheets

(56) References Cited

OTHER PUBLICATIONS

Santos, et al., "Security in Distributed Metadata Catalogues", Retrieved at <<http://documents.epfl.ch/users/d/de/desousa/www/papers/nsantos07ReplicationSecurity.pdf>>, Concurrency and Computation: Practice & Experience, Selection of Best Papers of the VLDB Data Management in Grids Workshop, vol. 20, No. 17, Dec. 2008, pp. 1-12.

* cited by examiner

FEDERATED AUTHENTICATION FOR MAILBOX REPLICATION

BACKGROUND

Electronic mail (email) use has become an integral part of people's daily lives. Many forms of communication, personal or business, have been replaced by email exchanges. Emails not only contain textual exchanges, but many modern email systems enable integration of multi-modal communications with emails. Thus, increasing amounts of textual, audio, video, and other forms of communication data is stored in individual mailboxes and central data storage facilities as part of the vast email exchange networks.

One characteristic of modern email systems is their diversity. Email systems may range from small email services set up by individuals to very large organizational email systems. As these diverse and numerous systems interact, security, privacy, and reliability are some of the aspects that have to be taken into consideration. For example, many email systems employ mailbox replication to protect against data loss.

Mailbox data replication across authentication boundaries like directory service systems (e.g. Active Directory® Forests) requires explicit credentials to be specified for data access across the authentication boundary. Relying on explicit credentials has challenges such as the credential having to be securely stored on the side that is driving the data replication, allowing another environment to store one of its credentials posing a risk to the side that is being accessed using this credential, and credentials expiring—hence they need to be managed separately in the remote forest for the data replication to continue—.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a data replication mechanism enabling distributed authentication by relying on the existing federation infrastructure rather than storing explicit credentials. According to some embodiments, the data replication mechanism may request a federation token with data replication capabilities targeted to a remote forest and pass this token to the remote forest in lieu of explicit credentials.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, mailbox data replication across authentication boundaries may be accomplished through requesting a federation token with data replication capabilities targeted to a remote forest and passing this token to the remote forest in lieu of explicit credentials. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing email systems and data replication for email systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
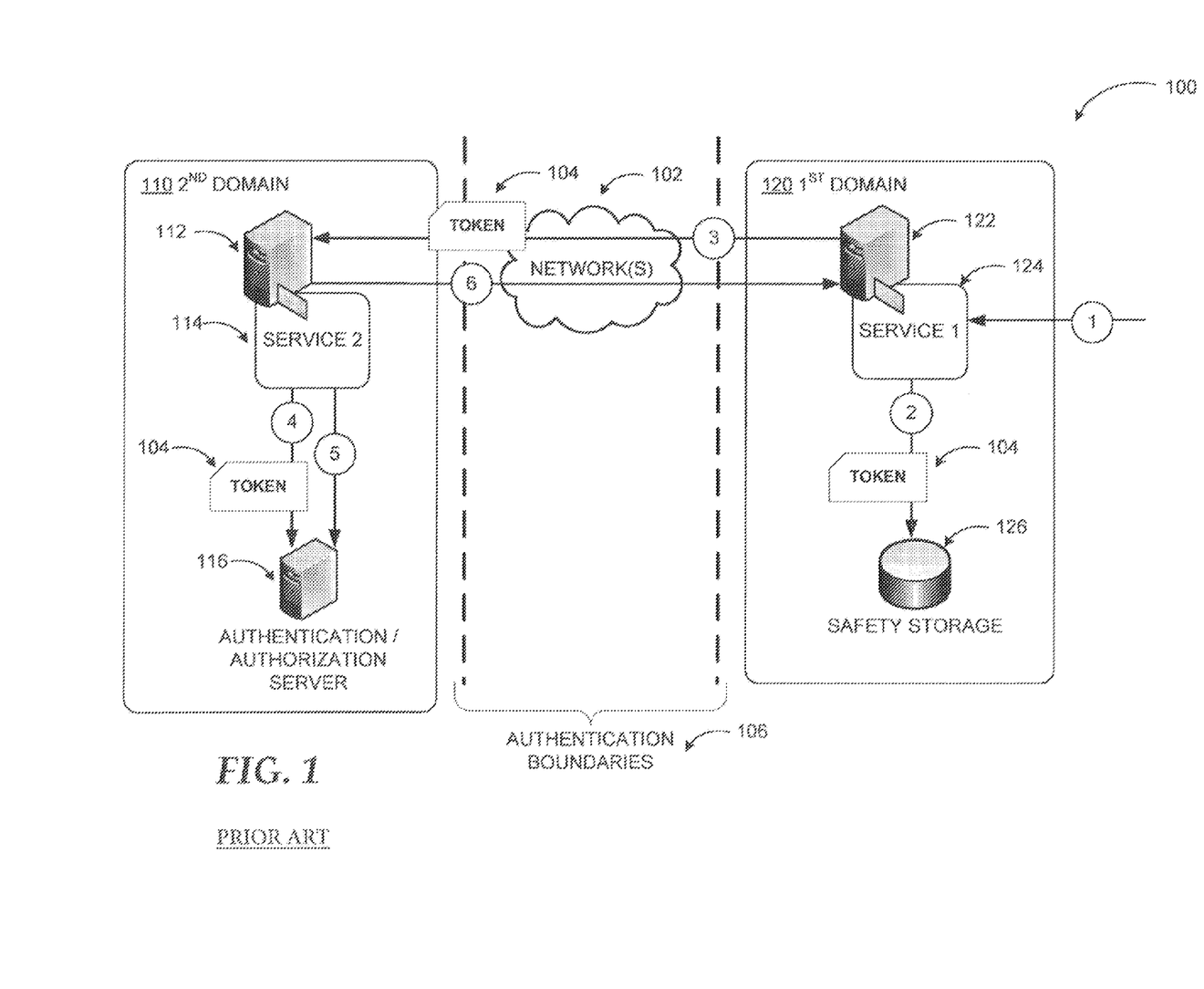
FIG. 1 is a diagram illustrating mailbox data replication process across authentication boundaries using conventional credential authentication methods.

Referring to FIG. 1, diagram 100 of an example system employing a mailbox data replication process across authentication boundaries using conventional credential authentication methods, is illustrated. Centralized identity management solutions were created to help deal with user and data security where the user and the systems accessed by the user are within the same network or domain. Such systems employ credentials to authenticate users for many processes. For example, mailbox access for data replication or similar tasks may use credentials to authenticate the user to the system being accessed and ensure compliance with security requirements. However, relying on explicit credentials may result in cumbersome redundancies when the processes involve crossing authentication boundaries like systems in different domains interacting via the Internet.

Diagram 100 illustrates how conventional credential based authentication impacts mailbox data replication processes across different domains. For example, a mail service 124 executed on server 122 in a first domain 120 may receive a request for data replication (e.g. redundant data protection) (arrow 1). As part of this request, credentials to access the source of the data replication needs to be captured. The user's credentials may be verified in his/her local domain and a token created in the local domain. As shown by arrow 2, mail service 124 or a management agent may store the token 104 in a safe repository 126 local to its own environment (first domain 120).

When it is time to replicate the data (e.g. a schedule driven replication), service 124 may read and send the token 104 to the second domain 110 together with or separately from the token 104 via network(s) 102 to access the actual data to be replicated (arrow 3). Service 114 executed by server 112 of the second domain 110 may check the token 104 against its own authentication source (server 116) to verify or deny the passed token 104 (arrow 4). At this time, service 114 may also perform an authorization check (arrow 5) confirming whether the passed token provides permission to perform the data replication.

If the token is authenticated and authorized, service 114 in second domain 110 may respond to service 124 in first domain 120 (arrow 6) with confirmation and the actual data if the data was also requested in the original request. The interaction between the services of the two domains occurs over authentication boundaries 106 (e.g. the Internet). As mentioned previously, this approach is not only redundant, but presents other challenges as well. For example, the token 104 has to be securely stored at the first domain 120; allowing another domain to store one of its credentials poses a risk to the second domain 110; and the credential may expire resulting in repetitive credential authentication/authorization processes slowing down the overall process, consuming resources, and degrading end user experience.

Figure 2:
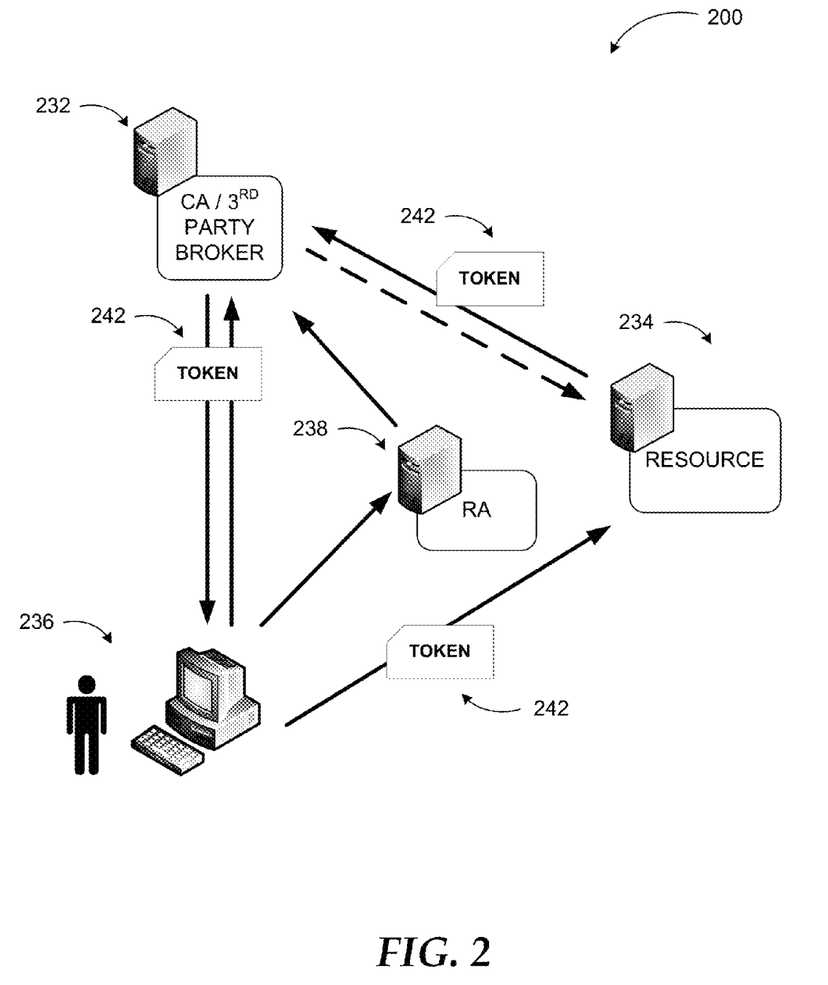
FIG. 2 is a conceptual diagram illustrating use of federated tokens in a federated identity management system.

FIG. 2 is a conceptual diagram illustrating use of federated tokens in a federated identity management system. Users in modern systems frequently access systems and resources in other domains through authentication boundaries rendering centralized identity management solutions inadequate and cumbersome. The widespread separation of users from systems to be accessed is one of the results of the integration of the Internet into many aspects of personal and business life. One of the solutions to these identity management challenges is federated identity management.

Federated identity, or the federation of identity enables the portability of identity information across otherwise autonomous security domains (authentication boundaries). Using identity federation users of one domain are enabled to securely access data/systems/resources of another domain seamlessly, and without the need for completely redundant user administration. Federated identity based systems are used in cross-domain, web-based single sign-on, cross-domain user account provisioning, cross-domain entitlement management, cross-domain user attribute exchange, and similar applications.

Such systems increase security and lower risk by enabling an organization to identify and authenticate a user once, and then use that identity information across multiple systems, including external partner websites. Privacy compliance can be enhanced by allowing the user to control what information is shared, or by limiting the amount of information shared. New account registrations or redundant login requirement may be eliminated through automatic federated provisioning and cross-domain single sign-on's, respectively.

Diagram 200 illustrates interactions in an example federated identity management system. A user 236 may establish an identity with a certificate authority or third party trust broker 232. A registration authority 238 may guarantee the trustworthiness of the third party trust broker 232 across authentication boundaries (e.g. different domains over the Internet). A token 242 may be used to establish the user's credentials without having to go through an internal authentication (and authorization) process each time a resource at a different domain is attempted to be accessed.

When user 236 attempts to access resource 234 in a different domain, simply passing the token 242 to the resource 234 may be adequate. Resource 234 may submit the token 242 to the third party trust broker 232 and receive a response if the token is not valid. Thus, resource 234 does not have to store the user's credential or perform an internal authentication process. Furthermore, resource 234 is not burdened with the process of maintaining up-to-date records in case the token 242 expires. The validity of the token is handled between the user and the third party trust broker 232.

While the example system in FIG. 2 has been described with specific components such as a certificate authority and a registration authority, embodiments are not limited to federate identity management systems according to this example configuration. An email system employing federated authentication for data replication may be implemented in other systems and configurations employing fewer or additional components.

Figure 3:
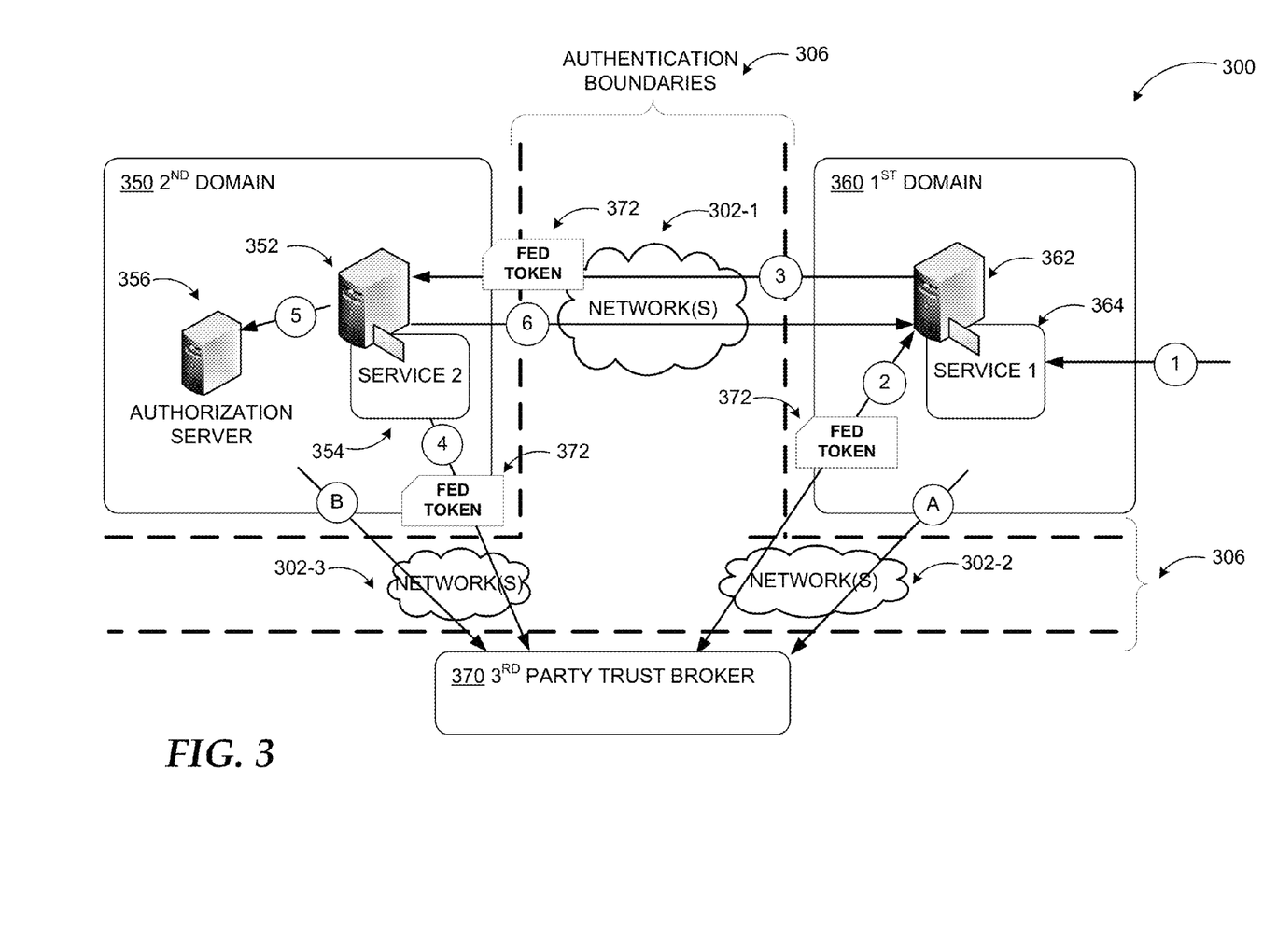
FIG. 3 is a diagram illustrating an example data replication process across authentication boundaries using federated tokens according to embodiments.

FIG. 3 includes diagram 300 illustrating an example data replication process across authentication boundaries using federated tokens according to embodiments. While a system according to embodiments is likely to include a number of servers, client devices, and services, example ones relevant to embodiments are shown in FIG. 3.

Similar to the process described in FIG. 1, a request is received (arrow 1) at service 364 of the first domain 360. However, in this case two preconditions are in place before any data replication is performed. As indicated by arrows A and B, first and second domains 360 and 350 establish and maintain a trust relationship with third party trust broker 370. This may be accomplished by exchanging source organization's certificate with the trust broker 370, and retrieving trust broker's certificate and federation metadata.

Since a federated authentication method is used, service 364 executed by server 362 does not need any explicit credentials from the second domain 350. Thus, no credentials need to be captured, stored, or managed (e.g. monitoring expiration of credentials). In response to the request (arrow 1), service 364 contacts the third party trust broker 370 to request a federated token 372 to be used for first domain 360 to authenticate to the second domain 350 (arrow 2). Federated token 372 may include the identity of the target (i.e. it can only be presented to the second domain). It may also include capabilities desired at the remote site (e.g. mailbox data replication, public folder data replication, etc.).

Upon receiving the federated token 372 from the third party trust broker 370, service 364 of first domain 360 submits the token to service 354 executed by server 352 of the second domain 350 (arrow 3) without having to send explicit credentials over an insecure medium such as the Internet. Service 354 of second domain 350 passes the federated token 372 to third party trust broker 370 as indicated by arrow 4. Third party trust broker performs the actual authentication and confirmation that the token is actually created by itself and is coming from the real first domain 360.

Optionally, second domain 350 may authorize the requested action through its internal authorization server 356 (arrow 5) by comparing the capabilities requested in the token against its own configuration. It may also use other information stored in the verified token to perform extra authorization checks. When the authorization process is completed, the remote site (second domain 350) may respond back with confirmation and, if requested, with the actual data for replication to the first domain 360.

The interactions between the first domain 360 and third party trust broker 370 may occur over network(s) 302-2. Similarly, the interactions between the second domain 350 and third party trust broker 370 may occur over network(s) 302-3. The interactions between the first domain 360 and the second domain 350 may occur over network(s) 302-1. Network(s) 302-1, 302-2, and 302-3 may also be the same network. These networks represent authentication boundaries 306 such as the Internet.

While many authentication, authorization, and communication modes and configurations may be employed during a mailbox data replication process, example ones are described above for illustration purposes. The scenarios, example systems, tokens, and configurations discussed herein are for example purposes, and do not constitute limitations on embodiments. Other forms of systems, configurations, capabilities, and tokens may be used in implementing a federated authentication for data replication using the principles described herein.

Figure 4:
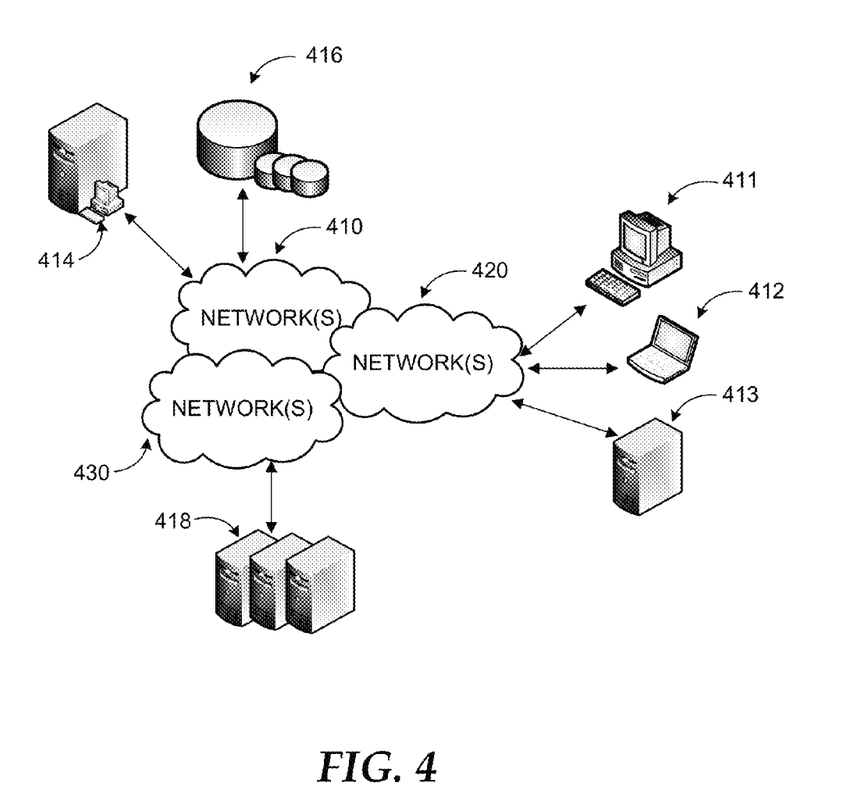
FIG. 4 is a networked environment, where a system according to embodiments may be implemented.

FIG. 4 is an example networked environment, where embodiments may be implemented. A platform providing data replication services within email systems may be implemented via software executed over one or more servers 418 such as a hosted service. The platform may communicate with client applications on individual computing devices such as a server 413 or a laptop computer 412 and desktop computer 411 ('client devices') through network(s) 410, 420, and 430.

As discussed above, modern electronic communications occur over numerous systems including one or more authentication boundaries such as the Internet. A system according to embodiments enables authentication of services in different domains without having to create, pass, store, or otherwise manage explicit credentials for authentication. Third party trust broker issued federated tokens may be used in place of explicit credentials in data replication (e.g. mailbox data replication).

A service or an application executed on client devices 411, 412 or server 413 in one domain may establish a trust relationship with a third party trust broker managed by server 414 and receive a federated token to prove that trust. When a task such as mailbox data replication is requested the service (or application) may pass its federated token to another service at a remote site (servers 418) to authenticate itself. The remote site does not have to perform any authentication process, but simply pass the token to the third party trust broker. No credentials are exchanged over unsecure environments such as the interconnection of networks(s) 410, 420, and 430. Any authentication related data may be securely stored and managed by the server 414 of the third party trust broker using data stores 416.

Network(s) 410, 420, and 430 may comprise any topology of servers, clients, Internet service providers, and communication media. A system according to embodiments may have a static or dynamic topology. Network(s) 410, 420, and 430 may include secure networks such as an enterprise network, an unsecure network such as a wireless open network, or the Internet. Network(s) 410, 420, and 430 may also coordinate communication over other networks such as Public Switched Telephone Network (PSTN) or cellular networks. Furthermore, network(s) 410, 420, and 430 may include short range wireless networks such as Bluetooth or similar ones. Network(s) 410, 420, and 430 provide communication between the nodes described herein. By way of example, and not limitation, network(s) 410, 420, and 430 may include wireless media such as acoustic, RF, infrared and other wireless media.

Many other configurations of computing devices, applications, data sources, and data distribution systems may be employed to implement an email system with federated infrastructure based data replication. Furthermore, the networked environments discussed in FIG. 4 are for illustration purposes only. Embodiments are not limited to the example applications, modules, or processes.

Figure 5:
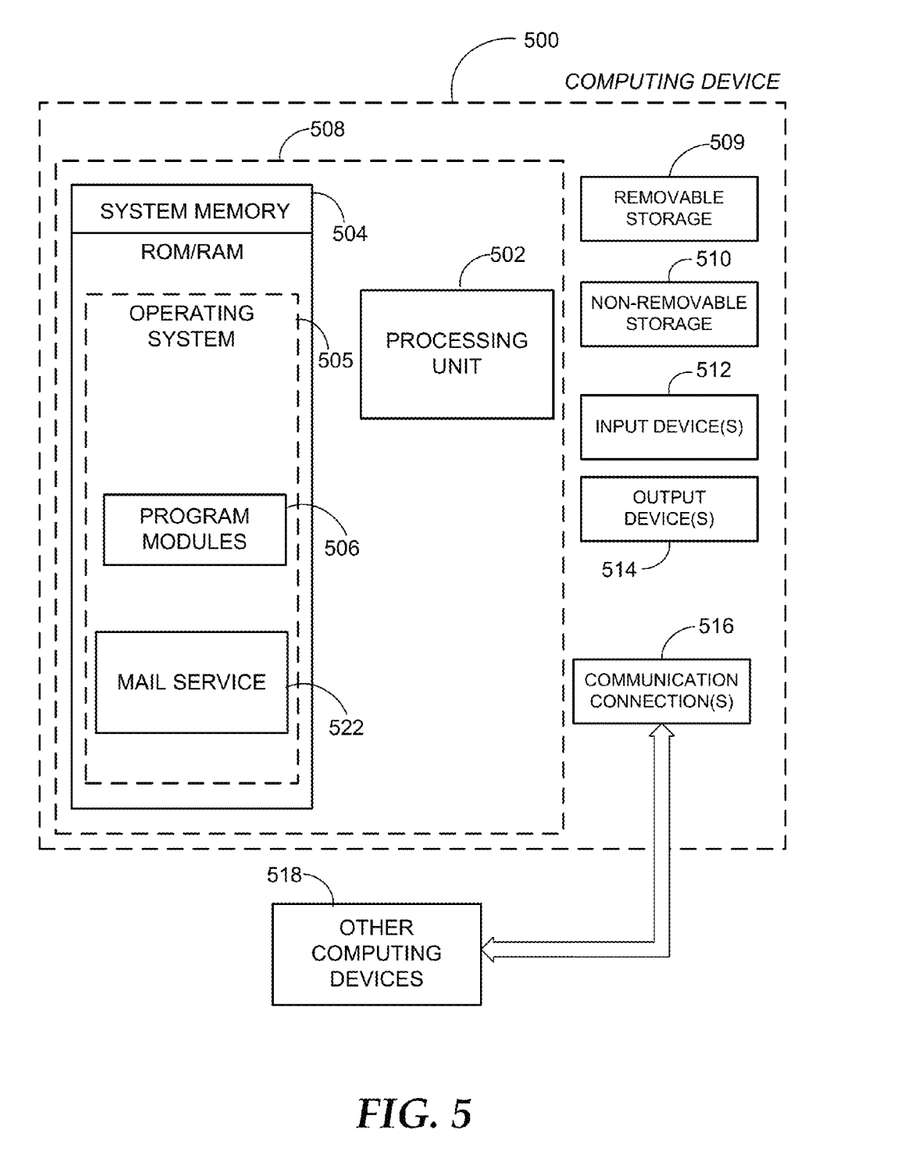
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server managing data replication as part of an email system and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506 and mail service 522.

Mail service 522 may perform data replication using federated authentication without exchanging explicit credentials over authentication boundaries as discussed previously. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
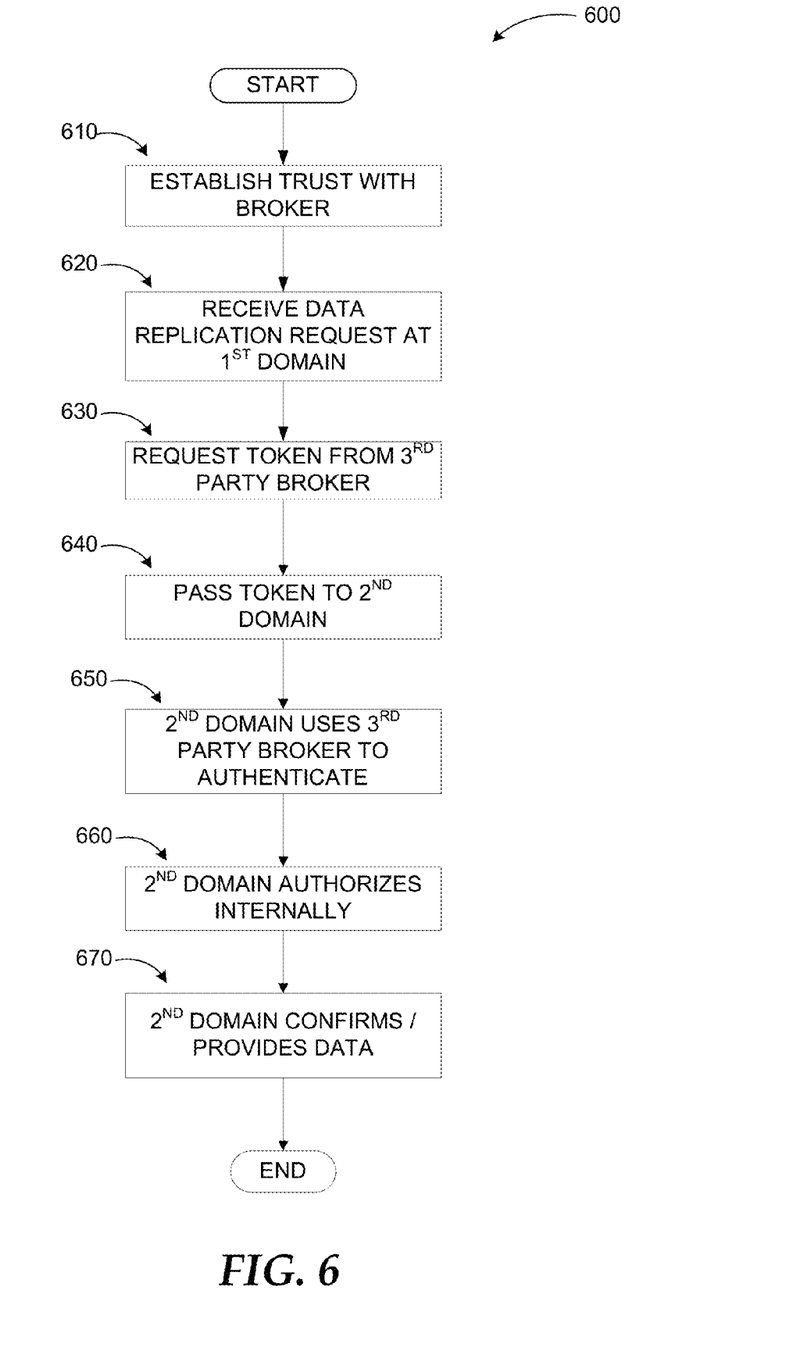
FIG. 6 illustrates a logic flow diagram for mailbox data replication using federated authentication according to embodiments.

FIG. 6 illustrates a logic flow diagram for process 600 of using federated infrastructure in an email system instead of using explicit credentials according to embodiments. Process 600 may be implemented as part of an email system that facilitates data replication across authentication boundaries.

Process 600 begins with operation 610, where a trust relationship is established between a service operating in a first domain and a third party trust broker. At operation 620, a data replication request may be received by the service operating in the first domain. The request may require interaction with another service operating in a second domain across authentication boundaries (e.g. the Internet).

At operation 630, the service operating in the first domain requests a federated token proving its trust relationship from the third party trust broker and passes this token to the service in the second domain as proof of its authentication at operation 640. At operation 650, the service in the second domain passes the token to the third party trust broker, which confirms that the token is authentic and it is from the service in the first domain.

Subsequently, the service in the second domain may internally authorize the request at optional operation 660 and send a confirmation (if both authentication and authorization are successful) to the service in the first domain at operation 670. If the data to be replicated is also requested, the service in the second domain may send the actual data along with the confirmation. According to some embodiments, a request for an attribute change may also be submitted along with the federated token.

The operations included in process 600 are for illustration purposes. An email service with data replication capability using federated infrastructure may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for employing federated authentication in data replication across authentication boundaries, the method comprising:

receiving a request at a first server of a second domain for data replication from a first service operating in a first domain at a second service operating in the second domain, wherein the request includes a federated token associated with the first service;

establishing a guarantee of trustworthiness of a third party trust broker across authentication boundaries from a registration authority;

passing the federated token to the third party trust broker issuing the federated token from the first server of the second domain to have the third party trust broker perform an authentication of the federated token by performing a confirmation that the federated token is created by the third party trust broker and is coming from the first domain;

receiving one of: the confirmation and a denial from the third party trust broker at the first server of the second domain;

submitting an authorization request to an authorization server of the second domain from the first server of the second domain using authentication related data associated with the federated token securely stored at the third party trust broker;

receiving one of a confirmation and a denial from the authorization server of the second domain based on a comparison of at least one desired capability to a configuration of the second domain; and responding to the first service with an affirmation of the request if a confirmation is received from the third party trust broker and the authorization server of the second domain.

2. The method of claim 1, wherein the federated token includes an identity of the second service as target and the at least one desired capability at the second service.

3. The method of claim 2, further comprising:
authorizing the request at the second service based on information associated with the first service stored by the second service at the second domain.

4. The method of claim 1, wherein the at least one desired capability includes one of: mailbox data replication and public folder data replication of an electronic mail system.

5. The method of claim 1, wherein the confirmation from the third party trust broker indicates that the federated token was generated by the third party trust broker and originated from the first service.

6. The method of claim 1, wherein the first service and the second service establish a trust relationship with the third party trust broker prior to processing the request.

7. The method of claim 1, wherein the request received from the first service is in response to a user request received by the first service.

8. The method of claim 1, further comprising:
sending data to be replicated along with the affirmation of the request to the first service.

9. The method of claim 1, wherein the first domain and the second domain are separated by the authentication boundaries.

10. The method of claim 9, wherein the authentication boundaries include the Internet.

11. A system for facilitating data replication in electronic mail services employing federated authentication, the system comprising:
a first server associated with a first domain executing a first service, the first service performing actions including:
establish a trust relationship with a third party trust broker by executing a process to:
exchange a certificate of the first service with the third party trust broker; and
retrieve a federation metadata of the third party trust broker;
receive a request for data replication;
request a federated token from the third party trust broker;
pass the federated token along with the request to a target service in a second domain that is separated from the first domain by at least one authentication boundary; and
a second server associated with the second domain executing a second service identified as the target service in the federated token, the second service performing actions including:
establish a trust relationship with the third party trust broker by executing another process to:
exchange another certificate of the second service with the third party trust broker; and
retrieve another federation metadata of the third party trust broker; pass the received federated token to the third party trust broker;
receive one of: a confirmation and a denial from the third party trust broker;
submit an authorization request to an authorization server of the second domain using authentication related data associated with the federated token securely stored at the third party trust broker;
receive one of a confirmation and a denial from the authorization server of the second domain based on a comparison of at least one desired capability to a configuration of the second domain;
respond to the first service with an affirmation of the request if a confirmation is received from the third party trust broker and the authorization server of the second domain; and
manage and securely store the authentication related data associated with the federated token at the third party trust broker.

12. The system of claim 11, wherein the authorization server is further configured to authorize the request based on the at least one desired capability included in the federated token and information associated with the first service stored at the second domain.

13. The system of claim 11, wherein the first service, the second service, and the third party trust broker communicate over one of: the same network and separate networks.

14. The system of claim 11, wherein at least one of the first service and the second service is an electronic mail application.

15. The system of claim 11, wherein at least one of the first service and the second service is a distributed electronic mail service executed by a plurality of servers.

16. A computer-readable memory device with instructions stored thereon for employing federated authentication in data replication across authentication boundaries, the instructions comprising:
establishing a guarantee of trustworthiness of a third party trust broker across authentication boundaries from a registration authority;
establishing individual trust relationships between a first service operating in a first domain and the third party trust broker, and a second service operating in a second domain and the third party trust broker by:
exchanging a certificate of the first and second services with the third party trust broker; and
retrieving a federation metadata of the third party trust broker;
receiving a request for data replication at the first service;
requesting a federated token from the third party trust broker at the first service;
passing the federated token along with the request from the first service to a server of the second service without exchanging a credential, wherein the federated token includes at least one desired capability at the second service;
passing the federated token to the third party trust broker issuing the federated token from the second service to have the third party trust broker perform an authentication of the federated token by performing a confirmation that the federated token is created by the third party trust broker and is coming from the first domain;
receiving one of: the confirmation and a denial from the third party trust broker at the server of the second service;
submitting an authorization request to an authorization server of the second domain from the server of the second service using authentication related data associated with the federated token securely stored at the third party trust broker;
receiving one of a confirmation and a denial from the authorization server of the second domain based on a comparison of at least one desired capability to a configuration of the second service;
if a confirmation is received from the third party trust broker, authorizing the request by comparing the at least one desired capability to a configuration of the second service at the authorization server of the second domain;

responding to the first service with an affirmation of the request and requested data by the second service; and managing and securely storing the authentication related data associated with the federated token at the third party trust broker.

17. The computer-readable memory device of claim 16, wherein the request is for at least one of: a mailbox data replication and a public folder data replication over the Internet.

18. The computer-readable memory device of claim 17, wherein the instructions further comprise:

submitting an attribute change to the second service along with the federated token.

19. The computer-readable memory device of claim 16, wherein the first domain and the second domain are websites.

* * * * *